Sept. 24, 1968 P. S. KELSEY 3,402,834
METHOD FOR STABILIZING BRICK CUBES AND BRICK
CUBES STABILIZED THEREBY
Filed Sept. 17, 1965 4 Sheets-Sheet 1

INVENTOR
PAUL S. KELSEY
BY Cushman, Darby & Cushman
ATTORNEYS

Sept. 24, 1968  P. S. KELSEY  3,402,834
METHOD FOR STABILIZING BRICK CUBES AND BRICK
CUBES STABILIZED THEREBY
Filed Sept. 17, 1965  4 Sheets-Sheet 2

INVENTOR
PAUL S KELSEY

BY Cushman, Darby & Cushman
ATTORNEYS

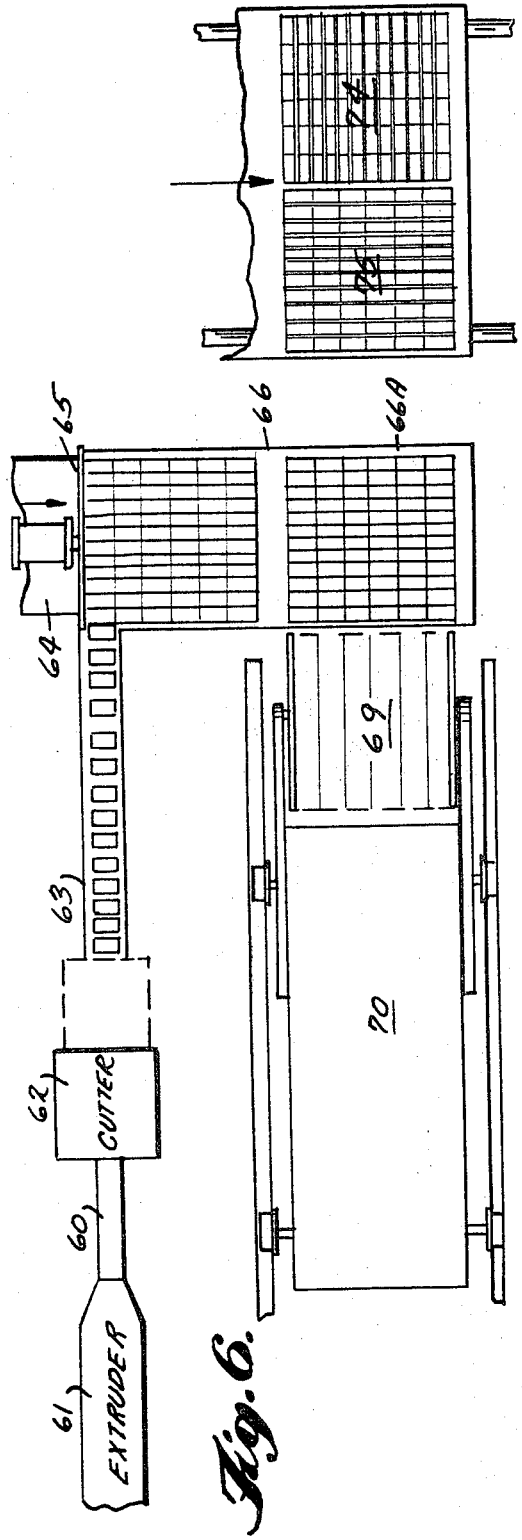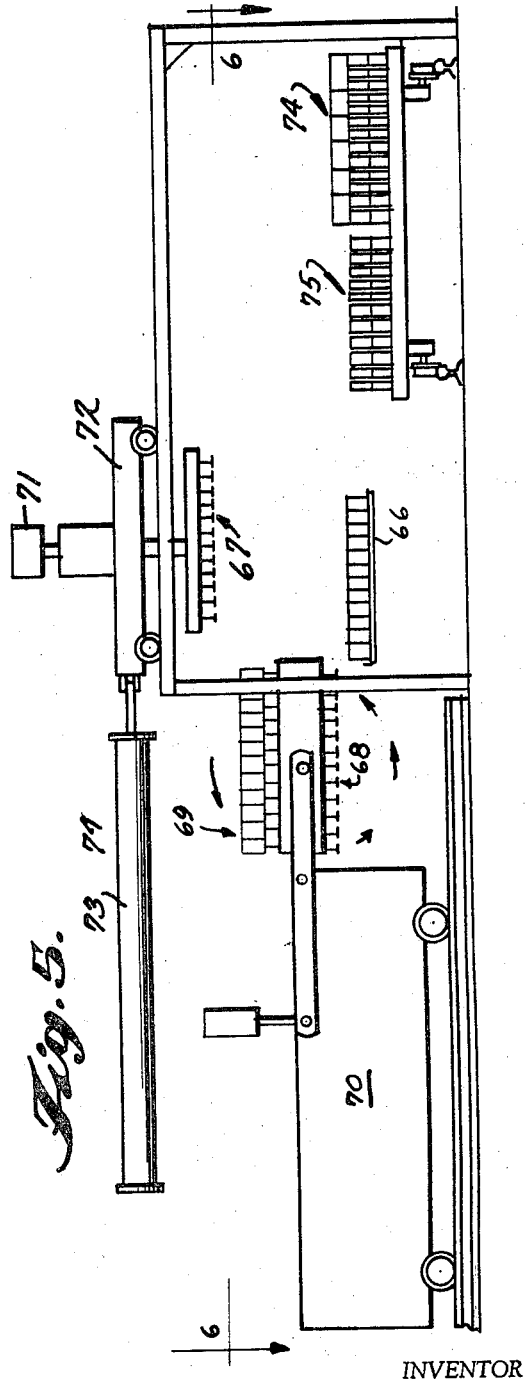

Sept. 24, 1968     P. S. KELSEY     3,402,834
METHOD FOR STABILIZING BRICK CUBES AND BRICK
CUBES STABILIZED THEREBY
Filed Sept. 17, 1965     4 Sheets-Sheet 4
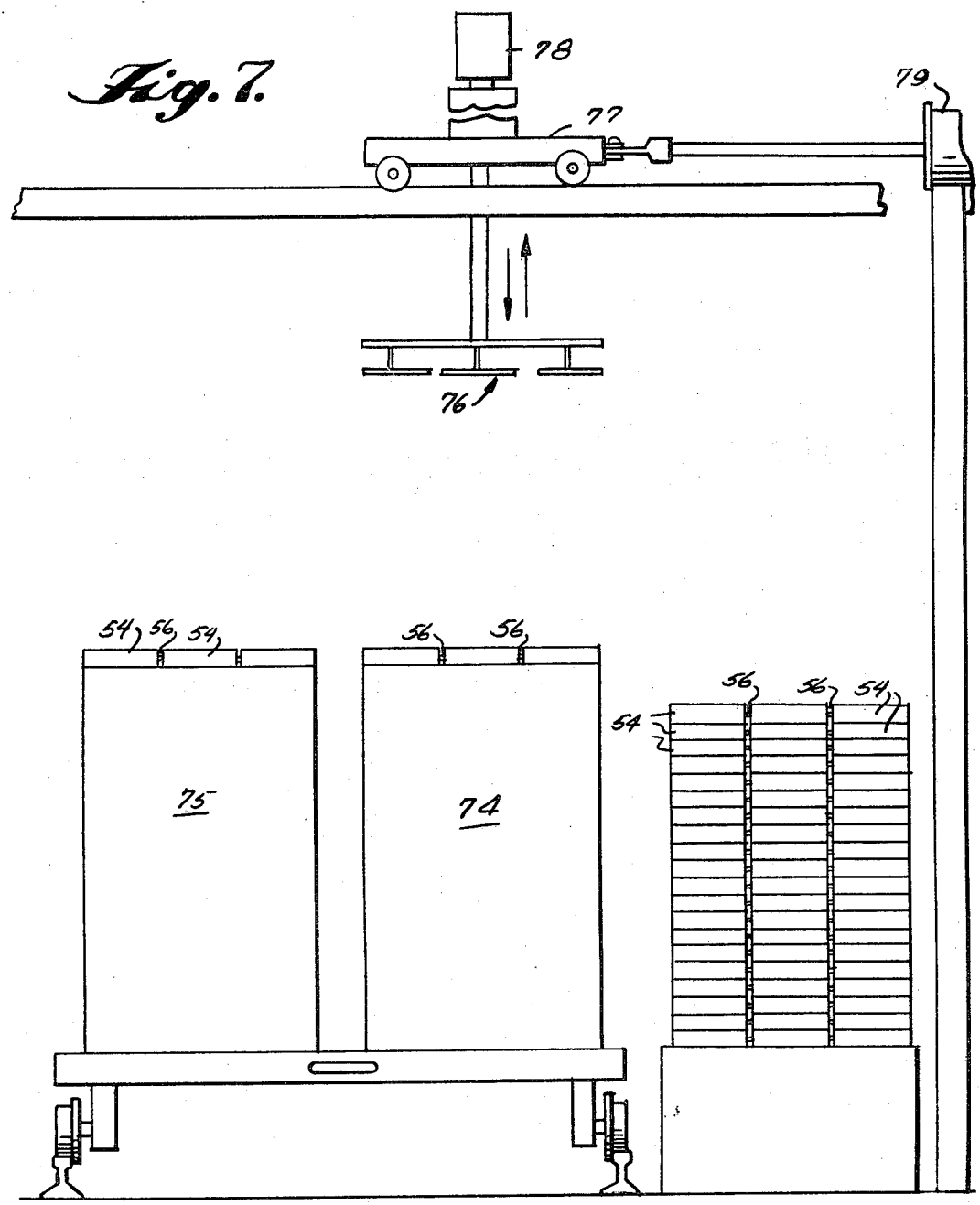
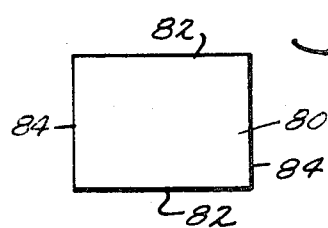
INVENTOR
PAUL S. KELSEY
BY *Cushman, Darby & Cushman*
ATTORNEYS United States Patent Office 3,402,834
Patented Sept. 24, 1968

3,402,834
METHOD FOR STABILIZING BRICK CUBES AND
BRICK CUBES STABILIZED THEREBY
Paul S. Kelsey, Rocky Hill Road,
Plymouth, Mass. 02360
Filed Sept. 17, 1965, Ser. No. 488,083
9 Claims. (Cl. 214—10.5)

ABSTRACT OF THE DISCLOSURE

Stabilizing green brick stacked in a cube on a kiln car for drying and firing, by depositing on the green brick, relatively heavy, rough surfaced plates each bridging a plurality of piers of brick in the cube, thus reducing independent lateral mobility of the piers. The plates may be of refractory material and loosely linked to one another. The plates have a collective horizontal cross-sectional area substantially equal to that of the cube.

---

The present invention relates to brick manufacture and more particularly to apparatus and a method for producing stable cubes of green brick to be dried and burned and for unloading the burned brick from the cubes.

Building brick is customarily made by excavating clay, shale or the like, comminuting the raw material wet or dry in a grinder, mill or other size reduction apparatus, moistening and mixing the comminuted raw material unitl it is in a plastic, formable state, extruding the plastic material through a die and cutting the extruded shape in a direction transverse to its longitudinal axis to defined individual "green" brick.

Green brick of the type of brick used in the United States for facing buildings, fireplaces, brick walls and the like are usually quite soft just after being molded and contain up to 20 percent water. Customarily the green brick are first dried by contacting them with warmed, dry air, then burned by placing the dried brick in a kiln.

In order to facilitate the processing of large volumes of brick on a continuous flow through basis it has become conventional to stack the green brick on kiln cars having metal wheels rollingly received on a metal track. Each kiln car customarily holds from three to four thousand brick set in cubes which consist of 12-20 layers or courses of green brick. In order to facilitate the passage of dry air through the cubes of green brick and to facilitate more rapid and uniform transfer of heat to and moisture from all of the brick in the cubes it has been found to be desirable to provide spaces between the brick in each layer.

As the brick are dried and fired they shrink considerably. For instance, a green brick having approximately 20 percent moisture content and originally 9 inches long as it comes from the extruder can shrink to a length of 8.5 inches while drying and to 7.5 inches while burning.

If the bricks are not stacked so that the moisture removing dry air and heat can contact all of the brick in the cube reasonably uniformly, shrinkage of the individual brick may take place sufficiently nonuniformly as to cause the cube of bricks to become unstable and disintegrate or collapse while the kiln car is being pushed through the dryer or kiln. The prospect of such a disrupting occurrence is especially great in situations where the kiln cars are sometimes unavoidably stopped or started joltingly or where fragments of scrap brick or other debris often become accidentally displaced onto the kiln car tracks so as to cause a rocking or jolting of the car as its wheels pass thereover.

After the brick on the kiln car have been dried and burned, they allowed to cool and are then remove from the kiln car and packaged for storage or shipment.

In times past, it was the custom to have laborers manually set the brick in cubes on the kiln cars, a fast, trained worker being able to stack up to 3,000 bricks per hour having a total weight of several tons. However, even as manual laborers have become accustomed in many other occupations to greater reliance on mechanical aids and less upon their own brawn, so it is in the brick making industry. Although high wages are paid to the green brick setters it has become difficult to attract new laborers for vacancies in the setting portion of the brick production line or even to retain those already employed since an opportunity to be employed in a mechanically assisted manual labor position where, although the wage may be somewhat less, the physical exertion required is much less, is much preferred by those having sufficient skill to follow either line of employment. The problem just outlined has tended to increase the cost of brick as compared to substitutable building materials produced by more highly automated industries and tended to stifle otherwise dynaimc growth of the brick making industry faced with rising demand. Accordingly, architects, planners and builders have to an increasing extent switched to substitute materials for many building needs to the deteriment of the brick making industry.

For this reason, as well as in order to obviate the bottleneck that manual cube building causes in brick production, the driving force to automate the green brick cube building portion of the brick production line has increased in recent years.

In response to this driving force, apparatus has been developed for lifting a plurality of brick arrayed in a square or rectangle and having a single layer, transporting the layer and spacing the brick therein from one another, and depositing the spaced array on a kiln car. Subsequently layers are individually piled by the apparatus on the first.

When green brick are manually set in cubes, usually header courses and stretcher courses of brick are interspersed with tie courses which bridge vertically extending gaps in the cube in order to give physical stability to the cube as a whole and reduce the possibility of collapse of the cube due to jolting during haulage or uneven shrinkage of the brick during drying and burning.

However, it has been found that at the present state of the automatic brick making machinery art, the setting apparatus cannot be programmed to set brick in tie courses as well as in header and stretcher courses, since the former require patterns which so far at least have proven impossible to generate and at the same time achieve acceptable production rates.

For this reason, setting machinery now in use is confined to automatically setting brick in alternating header and stretcher courses or pairs of same. Inasmuch as no tie courses are provided, the finished cube of automatically set green brick in essence consists of a plurality of unconsolidated columns of brick placed laterally adjacent one another. During movement of kiln cars carrying such cubes from station to station around the brick making establishment these cubes are especially susceptible to collapse in response to even slight jolting with attendant waste due to the necessary pick-up and resetting operation. During the drying and burning of such cubes, should shrinkage occur unevenly among the several columns of brick the cube may split open, suffer column failure and partial or complete collapse. The topping of one brick cube in the continuous dryer or kiln of a modern brick plant may necessitate shutting down the dryer or kiln and letting it cool down sufficiently for men to enter and work in same. Such a single complete shut down can result in a complete loss of all production for as long as ten days and entail a financial loss of up to $50,000.00.

Even if such barely stable cubes make it successfully through the dryer and kiln and cooling station, they usually have become so unpredictably disoriented that, at the present state of the art of the brick making machinery, it has not been effectively possible automatically to unload burned brick from such cubes, and unloading still being a manual operation which presents another expensive bottleneck in the manufacturing process.

With the foregoing problems in mind, it is a primary object of the present invention to provide a more stable brick cube and a method for forming and disassembling the same susceptible of use with automatic machinery.

It is another object of the present invention to provide a brick cube comprising a plurality of superimposed courses of brick arrayed in a plurality of vertical columns positioned laterally adjacent one another, said columns being united adjacent their uppermost extent by a plurality of relatively heavy plates supported upon said columns, each of said plates resting on more than one of said columns.

These and further objects of the present invention will become more clearly apparent during the course of the following detailed discussion relating to a preferred embodiment of the invention which is illustrated in the attached drawings.

In the drawings:

FIGURE 1 is an end elevation view of two prior art manually loaded brick cubes on a kiln car, the right cube having split open in spite of effective tie courses due to jolting and/or uneven shrinkage of the brick during drying and burning, an effective tie course being defined as one wherein at least one-third of a brick covers the butt joint of two lower adjacent end-to-end brick that are in alignment with it;

FIGURE 5 is a somewhat schematic elevation view of a brick cube loading station employing automatically operable apparatus;

FIGURE 6 is a somewhat schematic top plan view of the brick cube loading station of FIGURE 5;

FIGURE 7 is a schematic elevation view of the stabilizer plate loading station; and FIGURE 8 is a top plan view of a stabilizer plate modification.

Figure 1:
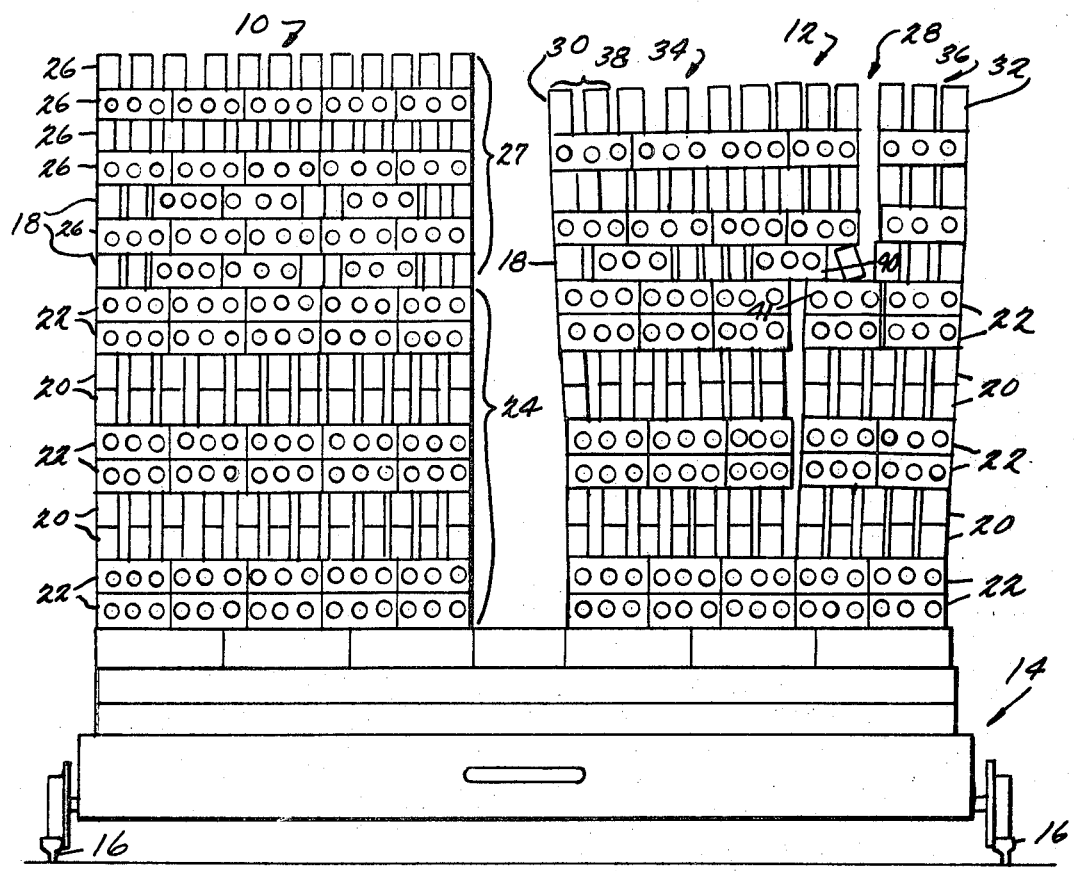

In FIGURE 1, manually built cubes 10 and 12 are shown supported on a kiln car 14, the latter being received for rolling movement on tracks 16 which may lead through several manufacturing stations including a drying tunnel (not shown) and kiln (not shown). Viewing the cube 10 it should be noticed that in order to provide a measure of stability to the cube tie courses 18 of brick have been used extensively. Not only do such courses each require a longer time to set but the brick therein do not become evenly dried and burned because of the unevenness of spacing between the individual brick in the tie courses and the relative scarcity of face to face setting of adjacent brick in the tie courses, such desirable face to face setting being confined to the header courses 22 and stretcher courses 20 in the lower region 24 of the cube 10 where they least affect the set stability. In the upper region 27 of the cube 10, alternating courses 26 such as are customarily interspersed with the tie courses 18 in manually set cubes are shown. The single alternating courses 26 tend to add stability to the cube but in most instances the faces of the brick lack desirable color uniformity, that face to face setting gives.

It should be noted in regard to cube 12, that because of a jolting the cube has received or due to uneven shrinkage of the bricks thereof during drying and burning, a split or fissure 28 has occurred intermediate the sides 30 and 32 of the cube 12. The portions 34 and 36 of the cube on either side of the split have begun to lean away from one another causing the sides 30 and 32 to be concave away from one another. Thus the tube 12 is extremely unstable in the condition shown, so that any further slight jarring or even normal vibrations often present in industrial plant environments because of other manufacturing operations, may cause collapse of the cube 12 as the upper portion of the rightmost column 36 of brick fails and the brick 40 of the upper tie course 18 disengages from the brick 41.

In any event it should be apparent from an inspection of the two cubes 10 and 12 shown in FIGURE 1 that it would be totally impractical to try and devise a machine capable of setting the complicated tie courses at an advantageous rate of speed. (One English concern now has spent close to a million dollars trying to make such a machine. The latest version would have to sell for no less than $100,000 and it would have difficulty in matching the output of two trained men.) All successful setting machines are productive in almost a direct ratio to the number of brick that they can pick up and place each cycle and the position of the brick they pick up must of necessity be arranged in a constant pattern. Each course of brick in any cube must be a duplicate of every other course, even though some may be turned over 180° and/or later turned around 90° before being deposited on the kiln car. The same basic considerations have to hold true for the unloading operations. The pick up head may turn its brick 90° but to be practical and have capacity, it must, in general, always come in contact with an equal number of brick that are in a very definite and fixed pattern. The layout of the brick to be picked up must also be a configuration that can be rather easily assembled mechanically from the continuous side by side flow of brick which stream out of the discharge end of an automatic cutter. Means have been devised to block off two or more rows of brick from the setting pattern to provide lift truck fork spaces in the bottom one or two courses of kiln car cubes, but the remaining brick, of course, maintain their constant position. Beyond this, practical setting machines have been stymied.

Even if a setting machine were devised to set a cube such as 12, it could not even attempt to unload the same cube after it had split up as shown. The vacuum pads or other type of grippers with their fixed positioning could not contact each and every brick. some types of grippers in use could not even grasp any brick on the top course or most other courses. Where there should be a finger space (slot) there would not be any and where there should be a brick surface there would only be air. Only a man's very flexible hands, guided by his eyes, can cope with brick on a brick cube that have moved from their set position. A machine may have many gripping elements but they can only function if each and every one contacts exactly right, each and every one of the brick in each course in succession.

Figure 2:
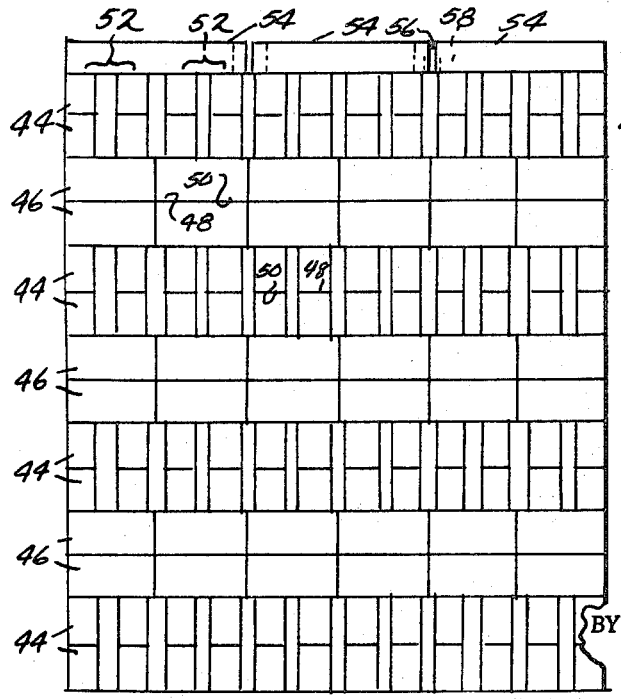
FIGURE 2 is an end elevation view of a cube according to the present invention.
Figure 3:
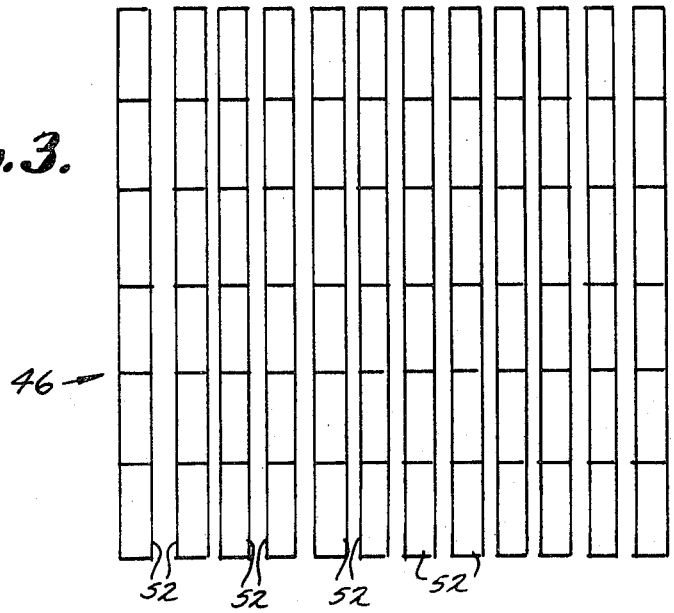
FIGURE 3 is a top plan view of a stretcher course of the cube of FIGURE 2.

A cube 42 of brick set by automatic machinery according to the present invention is shown in end elevation in FIGURE 2 having alternating pairs of stretcher courses 44 and header courses 46 throughout its entire height. If seen in side elevation, the stretcher courses would appear as header courses and vice versa since each comprises a plurality of laterally spaced rows of bricks, each brick having its longitudinal axis extending horizontally and aligned with the longitudinal axes of brick in the same row. The faces 48 of brick in the lower course of each pair of courses being in coextensive engagement with the faces 50 of the brick in the upper course of each pair of courses, the faces 48 and 50 being the ones intended to be presented outwardly in structures built from the brick, inasmuch as their surface coloration and texture can be varied and then held nearly uniform.

In the square cube 42, it should be noticed that the array actually comprises 36 vertical piers or columns 52 of brick positioned laterally adjacent one another in a 6×6 array, each pier column 52 comprising four brick in two vertically adjacent stretcher courses, resting upon four brick turned 90 degrees therefrom in two vertically adjacent header courses which in turn rest upon four brick in two vertically adjacent stretcher courses, etc., since no tie courses are provided. Alternatively, the brick may be straddle set, which consists of setting individual brick over the joint made by two brick positioned end-to-end to each other and at right angles. This apparent "tie" comes about automatically when setting brick of standard size with necessary spacing; just as two-on-two setting comes about when setting oversize brick, as shown in FIGURE 2 with necessary spacing. Such apparent ties are not effective tie courses.

Figure 4:
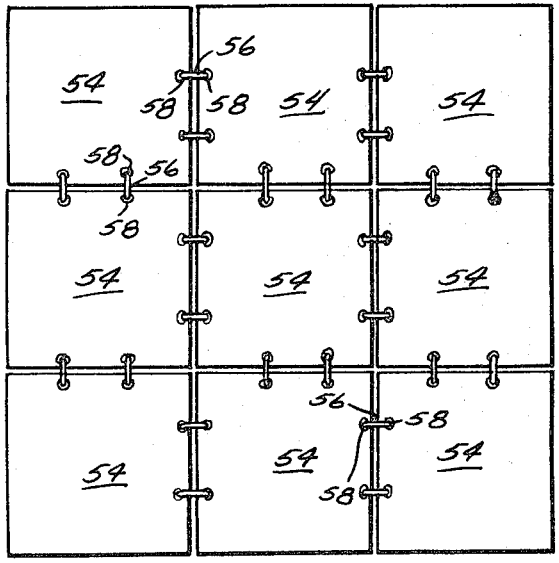
FIGURE 4 is a top plan view of the stabilizing plates shown at the top of the cube in FIGURE 2.

In order to consolidate the 36 piers of columns 52 of the cube 42, there is, according to the present invention, a final course of stabilizer plates 54 placed upon the cube. Although the plates 54 have been depicted at the very top of the cube, it should be realized that one or more additional courses could be placed upon the stabilizer plates or that one or more courses of such plates could be provided intermediate the upper and lower extent of the cube but predominantly in the upper region thereof. As can best be seen by comparing FIGURES 2 and 4, nine stabilizer plates 54 arranged in a 3×3 array surmount the 36 piers or columns of brick 52 thus consolidating the 36 piers of independently movable or columns of brick into nine, each having a base which is four times greater in area than the unconsolidated columns. The plates 54 are preferably of durable material which is sufficiently heavy and rough surfaced to prevent independent lateral movement of the brick upon which it is supported with respect to one another during drying and burning of the brick and transit of the cube about the plant during brick manufacture.

In their preferred form, the plates 54 are composed of refractory material although they could be made of stainless steel or other similarly durable material which could withstand repeated heating and cooling. Inasmuch as a plurality of plates 54, rather than a single rigid plate, are provided, a small amount of relative vertical and lateral movement among the plates is possible in response to uneven shrinkage of the brick thereunder.

In order to consolidate the entire cube into a single pier yet preserve the desirable limited vertical and lateral freedom of movement, the plates 54 may be loosely interconnected, for instance by metal or refractory rings or U-shaped devices 56 received in openings 58 or by loosely cooperative tongue and groove arrangements around the peripheries of the plates 54. As an alternative, a single square mat of heavy stainless steel wire mesh such as the type used to contain bomb explosions or the type used to provide temporary aircraft runways could be employed. The heavy wire mesh is desirable because it unites the entire cube into a single pier yet allows very limited relative vertical and lateral movement among the bricks due to its flexibility and the ability of its link or link-like elements to be either taut or slack with respect to one another.

Because of the placement of heavy consolidating members on the cube 42 when the cube of green brick is set up, the cube 42 is extremely stable and will not collapse or split open even under the most severe uneven shrinkage or jolting conditions to be reasonably expected in a brick making facility.

Accordingly, upon completion of the drying, burning and cooling of the brick of the cube 42, the heavy consolidating members 54 can be removed and the individual piers or columns of brick will be found to have moved such a small amount laterally with respect to one another that they can be unloaded with facility by automatic machinery similar or identical to that used to load the brick into the cube.

In exemplary apparatus for automatic brick making a continuous bar of clay 60 is extruded from an auger-type brick making machine, 61. This bar of clay is sliced into desired brick face thicknesses by an automatic reel brick cutter 62 that moves forward with the clay column while making its multiple cuts and then retracts to be in position for the next cut. The cut brick move onto an off bearing belt 63 which operates at a speed sufficient to not only take the brick cutter output but also to space the individual brick on it. At the end of the offbearing belt is a slide plate 64 onto which the brick consolidate. A reciprocating pusher bar 65 intermittently pushes forward a constant number of the consolidated cut green brick onto a table and at the same time blocks off any accumulated unneeded brick as well as holding back the fresh supply coming down the offbearing belt 63. When the pusher plate retracts, a fresh supply of brick feed into position. When the required number of rows of cut brick to make up a cube course have been pushed out onto the table 66, the table quickly slides outwards to a pick-up position 66A. This now solid pack of cut brick, constituting a cube course of brick, is then ready for pick off by the pickup head 67 or a turner head 68. When the turner 70 has two heads back to back, 68 and 69. When the cube needs a course of brick whose faces are down, the turner moves forward and presents the brick on its top head 69 which have their backs up. As soon as those brick are picked off, the turner assembly drops down sufficiently to engage its lower head 68 with the assembled brick on the reciprocating table. The turner assembly then raises and withdraws. When the turner clears the pick-up position, the double head assembly turns 180°. The bottom head is now empty and the top head full of brick with their faces down and backs up. Whenever the kiln car cube course needs to have brick with their faces up, the pick up head takes the brick directly from the table. All heads have individual foam rubber covered pads, one for each brick, with a central slot in same that is attached to a controlled vacuum line. The setting head has movement up and down by means of an air cylinder 71. It also can be power rotated 90°. The rows of vacuum pads are so mounted that they can be power spaced and retracted at any time. The pick up head with its powered raising and lowering unit and its power turn unit is mounted on a carriage 72 mounted on wheels which enables it to be quickly power moved to the center point of a kiln car outside cube 74, kiln car inside cube 75 or the delivery table 66 by means of one or more air cylinders 73.

The operation for 72, i.e. 6×12, brick cube coursing as shown in FIGURE 6 is as follows. The pick-up head is moved over pick-up position, drops down, engages six rows of twelve tightly packed brick that are on the reciprocating table 66 in position 66A. Vacuum is then applied to the individual pick-up pads. The pick-up head raises and moves over the kiln car while simultaneously spacing the 12 rows of brick about 1 inch apart. When the pick up head assembly reaches dead center of cube 74, the pick up head lowers to required height, the vacuum is cut and bled and the brick deposited on the kiln car, the first course of cube 74. These brick have their faces up. This operation is repeated in detail except that the brick are positioned for cube 75. The second course of brick for cube 74 need to have their faces down so the pick-up head obtains this course of brick from the top head of the turner 70. These brick are likewise spaced while in transit to cube 74 and are deposited directly on the first course face to face. The second course of brick for cube 75 is likewise picked up by their backs from the turner 70, spaced in transit and deposited directly in the first course, the face of each individual brick being in direct contact and in alignment with the face of the brick it is resting on. The brick for the third course are picked up from the marshalling table 66 (faces up), spaced, rotated 90° and set down across the already positioned second course brick of cube 74. The brick for a similar header course for cube 75 is next picked up (face up), spaced, rotated 90° and set down in exactly the same manner. The fourth course brick for cube 74 (face down) is picked off the top of the turner 70, spaced, rotated 90°, transferred and set down face to face with the third course. Cube 75's fourth course is likewise picked up from the turner 70, spaced, rotated 90°, carried across to correct cube alignment and deposited. The balance of cubes 74 and 75 are built up in a duplicate manner. Upon completion of the side by side cubes 74 and 75, the kiln car is moved gently forward sufficiently to bring new kiln car deck area in correct position.

The stabilizing cover plates can be put in position by several means but preferably by a separate very simple pick-up head and carriage assembly.

As illustrated in FIGURE 7, pick-up head 76 mounted on carriage assembly 77 with a raising and lowering air cylinder 78 and transverse air cylinder 79 travels over the area covered by the completed cubes 74 and 75, after the car they are setting in has been moved up. A cube of cover plates 54 in near perfect alignment are positioned alongside the kiln car. The head 76 moves over the cover plates, is lowered into contact with the uppermost course of cover plates, grasps it and is raised to a level slightly higher than the top course of green brick in cubes 74 and 75. The air cylinder 79 is then utilized to move the assembly 77 to near perfect alignment with cube 75 and the head 76 lowered sufficiently to have its cover plate coursing just above the top course of green brick. The course of plates is then released. The pick-up head then moves back over into vertical alignment with the supply of cover plates, is lowered, grabs a course of cover plates, is raised, is transversed to alignment over cube 74, lowered and the course of cover plates released. When the kiln car train is indexed forward, the operation is duplicated on the next pair of cubes.

After the kiln cars of brick have been dried, fired and cooled, they are ready by unloading. Preferably the cars would first pass under a stabilizing cover plate unloading machine which would be a duplicate of the previously described cover plate placing device. It would merely operate in reverse. It could pick up the cover plates off the cubes and deposit them beside the kiln car on special storage pallets.

The actual unloading of the brick cubes from the kiln cars can be accomplished by a near duplicate of the machine that set the green brick originally. The pick-up head of this unit could always operate in a fixed "spaced" position as it would be picking up spaced brick and discharging spaced brick. In its simplest and most unsophisticated version, this unit would merely pick up alternate courses of brick from two side by side cubes, by either their faces or backs, whichever was exposed, traverse to a primary position beside the kiln car, turn 90° or not as required (only the stretcher courses requiring the 90° turn), lower to a point that the two rows of brick which are outside, away from the car, just clear of two chain conveyors that run parallel to the kiln car tracks. The vacuum to these two outside rows of brick in a header course would then be cut, allowing these two rows of 12 spaced brick each to drop in their respective conveyors. The conveyors would then preferably be actuated, indexing forward far enough to present exposed chains underneath the pick-up head. While the conveyors are being moved forward, the pick-up head carriage would be indexing another two rows of brick away from the kiln car, thus placing two more rows of brick on centers over the two chain conveyors. Cutting and bleeding the vacuum lines to these two center rows of brick cause these brick to drop on their respective conveyors, which would then immediately index forward for the second time in this cycle and again present free sections for receiving another two rows of 12 spaced brick each, which the pick-up head, by indexing away from the kiln car a third time, would then have in their respective correct alignment. After dropping these two last rows, the pick-up head and carriage would immediately return to the correct kiln car cube for picking up its next course of 72 brick. The conveyor on receiving the last two rows of brick from the pick-up head, would index forward the required amount to clear itself underneath the pick-up discharge position. Unloading the balance of the car would be merely repetitive cycling with the introduction of necessary 90° turns by the pick-up head when stretcher courses of brick were involved.

More complicated and sophisticated arrangements, could be made so as to have all brick dropped on the conveyors in a face up position. By utilizing a modified "turner" all brick taken from the kiln car in a "backs up" position could be dropped on the top pick-up head of a "turner" which would then retreat, swing its dual head 180°, thus changing the position of the brick from "backs up" to "faces up" position. The turner would then move forward, drop its next course onto the kiln car two outside rows on the conveyor, index forward another two rows, drop them and then index two more rows and drop its last two rows of brick. All brick in the conveyor would thus be positioned face up.

The two chain conveyors with their loads of spaced brick at right angles to them, would in most cases first pass through an "inspection area" and then either through a manual pick off area or feed an automatic packaging and strapping unit which would deliver strapped cubes of brick to the end of a conveyor for pick off by a lift truck.

It should be realized that the operation of the brick and plate setting apparatus may be remotely controlled by an operator much as an overhead crane is operated, or because the process just described is repetitive and susceptible of complete automation, the brick and plate setting apparatus, as well as the operation of the green brick and finished brick conveyors and kiln cars, may be automatically programmed, the associated human then being an overseer of the apparatus rather than an operator thereof.

It should also be apparent that the improvement provided by the present invention as just fully outlined by making automatic loading and unloading of the brick from the kiln cars possible eliminates the last two manual labor bottlenecks from automatic brick making so that in utilizing the improvement described herein human hands need not touch the brick from the time its constituents are mined from the earth until when, after the bricks have been sold, the mason or helper selects a brick for laying.

As an example, each stabilizer plate 54 may be 16 inches wide, 16 inches long and 2½ inches thick and originally laterally spaced from one another by about 1 5/16 inches on a brick cube measuring 50 5/8 inches by 50 5/8 inches. Where economic or other conditions dictate, the stabilizer plates or any fraction of them may advantageously be non-square, for instance they may be rectangular. The stabilizer plate 80 shown in FIGURE 8 is in all respects similar to those shown in FIGURES 2, 4 and 7 but for being rectangular rather than square. Means such as the devices 56 and openings 58 (FIGURE 4) for associating the plate 80 with other plates 80 or 54 may be provided. As an example, each stabilizer plate 80 may be 16 inches in extent along its sides 82, 12 inches in extent along its sides 84 and 2½ inches thick. Twelve plates 80 when laterally spaced from one another by about 1 5/16 inches in a 3 by 4 array on a brick cube measuring 50 5/8 inches by 50 5/8 inches substantially cover the cube and perform satisfactorily.

Preferably, the tile or plates 80 are placed so that their long dimension is parallel to the kiln car tracks. This type of placement has been found to give the greatest protection against damaging bumps with cars on the same track and also from shrinkage pulls when firing with crown burners into the void spaces between adjacent cubes of brick on the same and on adjacent kiln cars. Where side firing is employed, it may in some instances be preferable to have the long sides 82 of the cover plates 80 extend transversely across the car so as to give better protection against side shrinkage pull encountered with such firing procedure.

Even in instances where the finished brick are to be hidden from view in the structure in which they are incorporated, which renders the setting of the raw brick in a face to face orientation superfluous, the stabilizing plates and method of the invention can be advantageously used both where the brick are dried previous to being set and where the brick are set previous to being dried. In each case the plates are put in position as the cube is set or as a terminal step of setting the cube as described herein.

Although a preferred embodiment of the present invention has been described herein in order to clearly elucidate the objects and principles of the present invention, it must be realized that many modifications of the embodiment may be made without departing from these principles and therefore the invention should be understood as encompassing all such modifications as are within the spirit and scope of the following claims.

I claim:

1. In combination with a brick cube comprising a plurality of vertically superimposed courses of brick, said brick having at least two substantially disparate directions of longitudinal extent among said courses, said courses collectively defining a plurality of vertically extending piers of brick located laterally adjacent one another; the exterior sides of said cube being open and laterally unconfined throughout substantially the entire height of the cube; means supported on said cube in the upper region thereof bridging a plurality of said piers, said bridging means being of greater horizontal cross-sectional area than each pier and being of sufficient weight and surface roughness to materially reduce the independent lateral mobility of said piers in the upper region of said cube.

2. The combination of claim 1 wherein said bridging means comprise at least one plate of refractory material.

3. The combination of claim 1 wherein each pier contains two substantially mutually parallel bricks per course, wherein said bridging means comprises a plate, said plate being substantially square in horizontal cross-sectional shape, and wherein said plate surmounts at least four of said piers.

4. The combination of claim 3 wherein said cube comprises at least eight of said piers arrayed in at least two groups of four piers, each group having a substantially square horizontal cross-sectional shape, each of said groups being surmounted by one plate.

5. In combination with a brick cube comprising a plurality of vertically superimposed courses of brick, said brick having at least two substantially disparate directions of longitudinal extent among said courses, said courses collectively defining a plurality of vertically extending piers of brick located laterally adjacent one another; means supported on said cube in the upper region thereof bridging a plurality of said piers, said bridging means being of greater horizontal cross-sectional area than each pier and being of sufficient weight and surface roughness to materially reduce the independent lateral mobility of said piers in the upper region of said cube; each pier containing two substantially mutually parallel bricks per course, said bridging means comprising a plate, said plate being substantially square in horizontal cross-sectional shape, said plate surmounting at least four of said piers; said cube comprising at least eight of said piers arrayed in at least two groups of four piers, each group having a substantially square horizontal cross-sectional shape, each of said groups being surmounted by one plate; means loosely interconnecting each plate whereby each plate is limited in lateral movement with respect to each other plate and all of the piers surmounted by the plates are consolidated into a single unit.

6. The combination of claim 3 wherein each pier consists solely of alternating pairs of courses of brick wherein the longitudinal axes of brick in vertically adjacent pairs of courses are at substantially right angles to one another, each brick having opposed longitudinal faces, each brick having one of said faces presented downwardly and the other of said faces presented upwardly, the upper face of each brick of each lower course of each pair of said pairs of courses being substantially coextensively abutting the lower face of each brick of each upper course of said pair whereby said cube is easily assembled and disassembled with automatic machinery.

7. The combination of claim 4 wherein the plates have a collective horizontal cross-sectional area substantially equal to that of said cube.

8. A method for arranging green bricks in a substantially completely open-sided stack for drying and burning so as to promote evenness of drying and burning thereof and stability of the stack comprising; depositing a plurality of vertically superimposed courses of green brick upon a support; blanketing said courses with a relatively heavy, heat resistant covering; and advancing the support through a drying and burning station.

9. The method of claim 8 wherein said green brick are deposited in a plurality of vertically extending, laterally adjacent piers, each pier having two mutually parallel brick per course spaced laterally from one another, each of said brick being deposited so as to rest on a longitudinal face thereof, said brick being deposited in vertically adjacent pairs of courses, the adjacent of said courses having their longitudinal axes mutually perpendicular.

References Cited

UNITED STATES PATENTS

| 1,033,138 | 7/1912 | Wiles | 264—58 |
| 1,465,737 | 8/1923 | Mitchell. | |
| 1,503,452 | 7/1924 | Fuller | 214—6 |
| 1,966,893 | 7/1934 | Harris | 294—67 |
| 2,278,571 | 4/1942 | Skinner | 214—10.5 X |

FOREIGN PATENTS 852,526   10/1952   Germany.

ROBERT G. SHERIDAN, *Primary Examiner.*

G. F. ABRAHAM, *Assistant Examiner.*